(12) United States Patent
Grasser et al.

(10) Patent No.: US 11,480,412 B2
(45) Date of Patent: Oct. 25, 2022

(54) SYSTEM AND METHOD FOR TRACKING A TARGET AND FOR COMPENSATING FOR ATMOSPHERIC TURBULENCE

(71) Applicant: COMPAGNIE INDUSTRIELLE DES LASERS CILAS, Orléans (FR)

(72) Inventors: Régis Grasser, Olivet (FR); Marie Naiim-Habib, Orléans (FR)

(73) Assignee: COMPAGNIE INDUSTRIELLE DES LASERS CILAS, Orléans (FR)

( * ) Notice: Subject to any disclaimer, the term of this patent is extended or adjusted under 35 U.S.C. 154(b) by 721 days.

(21) Appl. No.: 16/454,889

(22) Filed: Jun. 27, 2019

(65) Prior Publication Data

US 2020/0011973 A1 Jan. 9, 2020

(30) Foreign Application Priority Data

Jul. 5, 2018 (FR) ...................................... 1800716

(51) Int. Cl.
*F41G 3/08* (2006.01)
*G01S 7/481* (2006.01)
(Continued)

(52) U.S. Cl.
CPC .............. *F41G 3/08* (2013.01); *F41G 3/145* (2013.01); *G01S 7/4815* (2013.01); *G01S 7/497* (2013.01); *G01S 17/48* (2013.01); *G01S 17/95* (2013.01)

(58) Field of Classification Search
CPC ........ G01S 7/4815; G01S 7/497; G01S 17/48; G01S 17/95; G01S 7/4814; G01S 7/4818; F41G 3/145; F41G 3/08
See application file for complete search history.

(56) References Cited

U.S. PATENT DOCUMENTS

| | | | |
|---|---|---|---|
| 4,776,691 A | 10/1988 | Johnson et al. | |
| 5,093,563 A * | 3/1992 | Small | G02B 27/58 250/353 |

(Continued)

FOREIGN PATENT DOCUMENTS

CN 102944932 A 2/2013

OTHER PUBLICATIONS

Rapport de Recherche Préliminaire mailed Feb. 22, 2019, issued in priority French Application No. 1800716, filed Jul. 5, 2018, 2 pages.

*Primary Examiner* — Jennifer D Bennett
(74) *Attorney, Agent, or Firm* — Christensen O'Connor Johnson Kindness PLLC (57) ABSTRACT

A system and a method for tracking a target and for compensating for atmospheric turbulence is described. In an embodiment, the system includes at least two light sources each emitting a light beam to the target; at least two collimators that collimate the light beam of the associated light source; and a reference device to reflect a portion of the light beam exiting from all the collimators. The system also includes: at least two targeting modules to lead the light beam from the light source to reach a predetermined zone of the target; at least two detection modules to receive and detect the portion of the beam reflected by the reference device; a module for determining angle of deviation; a module for determining phase deviation; and an adjustment module for adjusting each of the light sources in order to compensate for atmospheric turbulence.

12 Claims, 3 Drawing Sheets

(51) Int. Cl.
*G01S 7/497* (2006.01)
*G01S 17/48* (2006.01)
*F41G 3/14* (2006.01)
*G01S 17/95* (2006.01)

(56) References Cited

U.S. PATENT DOCUMENTS

2003/0206350 A1 11/2003 Byren et al.
2019/0154439 A1* 5/2019 Binder ................. G01B 11/026

* cited by examiner

SYSTEM AND METHOD FOR TRACKING A TARGET AND FOR COMPENSATING FOR ATMOSPHERIC TURBULENCE

TECHNICAL FIELD

Embodiments of the present disclosure relate to the field of laser targeting devices, and more specifically, a system for tracking a target and compensating for atmospheric turbulence.

BACKGROUND

Controlling parameters of a laser beam or of any other directional light beam is an important issue. Below, in the description, the term "beam" or "light beam" will be used to refer to the laser beam or of any other directional light beam.

The distance between the light source, which emits the light beam to designate a target, and the target can be very large. Generally, using a single light beam is not sufficient to contact the target, because the power of a single light beam is greatly weakened by the path between the source of the light beam and the target. Thus, usually, several elementary light beams are used in combination; which makes it possible to obtain a light beam that is very powerful, formed by all of the elementary light beams.

When a large number of elementary light beams are used, it is necessary to know the configuration of each of the light beams separately in order to adjust the parameters thereof to maintain a maximum power of the light beam formed by all of the elementary light beams. However, it is difficult to determine which elementary light beam has an operating configuration that reduces the power of the light beam formed by all of the elementary light beams, in order to adjust the configuration of the light beam.

There are devices that make it possible to resolve this problem. But, these devices implement complex adaptive optical loops or devices that require substantial quantities of calculations. These devices are therefore not suitable for systems that comprise a substantial number of elementary light beams.

SUMMARY

The present disclosure aims to overcome these disadvantages by proposing a system that makes it possible to track a target and to compensate for the turbulence generated by the atmosphere.

To this effect, the disclosure relates to a system for tracking a target and for compensating for atmospheric turbulence.

According to the disclosure, the system comprises:
- at least two light sources each configured to emit a light beam to the target along an axis of propagation in an emission direction;
- at least two collimators, with each of the collimators being respectively associated with one of the light sources, with each one of the collimators being configured to collimate the light beam of the associated light source;
- a reference device arranged downstream of all the collimators in the emission direction, the reference device comprising a reflecting plane configured to reflect a portion of the light beam exiting from all the collimators;
- at least two targeting modules, with each one of the targeting modules being associated respectively and integrally with one of the light sources, with each of the targeting modules being configured to lead the light beam from the light source to reach a predetermined zone of the target;
- at least two detection modules, with each of the detection modules being associated respectively and integrally with one of the light sources, with each of the detection modules comprising a first detection surface configured to receive the portion of the beam reflected by the reference device, the portion of the beam reflected by the reflecting plane of the reference device being received and detected on the first detection surface at a current position;
- at least two modules for determining an angle of deviation, configured to respectively determine an angle of deviation from a spatial shift on the first detection surface between a reference position on the first detection surface and the current position, the angle of deviation being determined after each of the targeting modules has led each of the light beams to reach the predetermined zone of the target, with the angle of deviation corresponding to an angle between the portion of the beam reflected by the reflecting plane of the reference device and the axis of propagation;
- a module for determining phase deviation, configured to determine phase deviations from angles of deviation determined by the at least two modules for determining an angle of deviation, with the module for determining phase deviation being configured to determine a wave front reconstituted from angles of deviation, the phase deviations being determined by the module for determining phase deviation by comparing the reconstituted wave front with a plane wave front which is parallel to the reflecting plane of the reference device; and
- at least two adjustment modules, configured to adjust each of the light sources to compensate for atmospheric turbulence according to the wave front determined by the modules for determining wave fronts.

Thus, according to the disclosure, it is possible to both track the target to be reached and to compensate for the effects of the turbulence generated by the atmosphere without the use of complex optical loops or substantial calculations.

Advantageously, each of the collimators comprises at least one exit pupil, with each of the collimators having an optical axis, with the optical axis forming a non-zero angle with the axis of propagation such that the axis of propagation intersects the optical axis on the exit pupil of each one of the collimators.

In a non-limiting manner, the non-zero angle has a value greater than 0° and less than or equal to 5°.

According to a first embodiment, each of the targeting modules comprises:
- a second detection surface configured to receive an image that represents the target;
- a unit for locating configured to locate on the image of the target received by the second detection surface, a position of the predetermined zone to be reached on the target by the light beam and a current position of the zone reached by the light beam;
- a unit for calculating configured to calculate a movement to be carried out between the current position of the zone reached by the light beam and the position of the predetermined zone to be reached on the target; and
- a movement unit configured to move the light source such that the current position of the zone reached by the light beam is superposed with the position of the predetermined zone to be reached, from the movement to be carried out calculated by the unit for calculating.

According to a first alternative of the first embodiment, the system further comprises a plate arranged in the axis of propagation, with the plate having a surface configured to receive the light beam from the light source and to receive the image that represents the target.

The surface is capable of transmitting the light beam from the light source and to reflect towards the second detection surface the image that represents the target.

According to a second alternative of the first embodiment, the system further comprises a plate arranged in the axis of propagation, with the plate having a surface configured to receive the light beam from the light source and to receive the image that represents the target.

The surface is capable of reflecting the light beam from the light source and to transmit towards the second detection surface the image that represents the target.

According to a second embodiment, the system further comprises a targeting laser device, configured to emit a targeting laser beam on the predetermined zone to be reached on the target.

Each of the targeting modules comprises:
a second detection surface configured to receive an image that represents a position of the targeting laser beam on the target and a position of the light beam on the target;
a unit for locating configured to locate on the image received by the second detection surface the position of the targeting laser beam on the target and the current position of the light beam on the target;
a unit for calculating configured to calculate a movement to be carried out between the current position of the light beam on the target and the position of the targeting laser beam on the target; and
a movement unit configured to move the light source such that the current position of the light beam on the target is superposed with the position of the targeting laser beam on the target, from the movement to be carried out calculated by the unit for calculating.

According to a first alternative of the second embodiment, the system further comprises a plate arranged in the axis of propagation, with the plate having a surface configured to receive the light beam from the light source and to receive the image that represents the position of the targeting laser beam on the target and the position of the light beam on the target.

The surface is capable of transmitting the light beam from the light source and to reflect towards the second detection surface the image that represents the position of the targeting laser beam on the target and the position of the light beam on the target.

According to a second alternative of the second embodiment, further comprises a plate arranged in the axis of propagation, with the plate having a surface configured to receive the light beam from the light source and to receive the image that represents the position of the targeting laser beam on the target and the position of the light beam on the target.

The surface is capable of reflecting the light beam from the light source and to transmit towards the second detection surface the image that represents the position of the targeting laser beam on the target and the position of the light beam on the target.

The disclosure also relates to a method for using the system for tracking a target and for compensating for atmospheric turbulence.

According to the disclosure, the method comprises the following steps, repeated cyclically:
a step of emitting, implemented by each of the light sources, comprising emitting a light beam to the target along an axis of propagation in an emission direction;
a step of collimating light beams, implemented by each of the collimators, comprising collimating each of the light beams emitted by each of the light sources;
a step of targeting, implemented by each of the targeting modules, comprising leading the light beam from the light source to reach a predetermined zone of the target;
a step of detecting, implemented by each of the detection modules, comprising receiving and detecting on the first detection surface the portion of the beam reflected by the reflecting plane of the reference device at a current position;
a step of determining angle of deviation, implemented by each of the modules for determining an angle of deviation, comprising determining an angle of deviation from a spatial shift on the first detection surface between a reference position on the first detection surface and the current position, the angle of deviation being determined after each of the targeting modules has led each of the light beams to reach the predetermined zone of the target, with the angle of deviation corresponding to an angle between the portion of the beam reflected by the reflecting plane of the reference device and the axis of propagation;
a step of determining phase deviation, implemented by the module for determining phase deviation, comprising determining phase deviations from angles of deviation determined in the step of determining angle of deviation, the step of determining phase deviation comprising determining a wave front reconstituted from angles of deviation, with the phase deviations being determined in the step of determining phase deviation by comparing the reconstituted wave front with a plane wave front which is parallel to the reflecting plane of the reference device; and
a step of adjusting, implemented by each of the adjustment modules, comprising adjusting each of the light sources to compensate for atmospheric turbulence according to the phase deviations determined in the step of determining phase deviation.

According to the first embodiment, the step of targeting comprises the following sub-steps:
a sub-step of receiving, implemented by a second detection surface, comprising receiving an image that represents the target on the second detection surface;
a sub-step of locating, implemented by a unit for locating, comprising locating on the image of the target received by the second detection surface, a position of the predetermined zone to be reached on the target by the light beam and a current position of the zone reached by the light beam;
a sub-step of calculating, implemented by a unit for calculating, comprising calculating a movement to be carried out between the current position of the zone reached by the light beam and the position of the predetermined zone to be reached on the target; and
a sub-step of moving, implemented by a movement unit, comprising moving the light source such that the current position of the zone reached by the light beam is superposed with the position of the predetermined zone to be reached, from the movement to be carried out calculated by the unit for calculating.

According to the second embodiment, the step of targeting comprises the following sub-steps:
- a sub-step of emitting, implemented by a targeting laser device, comprising emitting a targeting laser beam on the predetermined zone to be reached on the target;
- a sub-step of receiving, implemented by a second detection surface, comprising receiving an image that represents a position of the targeting laser beam on the target and a position of the light beam on the target;
- a sub-step of locating, implemented by a unit for locating, comprising locating on the image received by the second detection surface the position of the targeting laser beam on the target and the current position of the light beam on the target;
- a sub-step of calculating, implemented by a unit for calculating, comprising calculating a movement to be carried out between the current position of the light beam on the target and the position of the targeting laser beam on the target; and
- a sub-step of moving, implemented by a movement unit, comprising moving the light source such that the current position of the light beam on the target is superposed with the position of the targeting laser beam on the target, from the movement to be carried out calculated by the unit for calculating.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The remainder of the description will refer to the figures mentioned above.

The disclosure relates to a system 1 for tracking a target 4 and for compensating for atmospheric turbulence. Below in the description, the "system for tracking a target and for compensating for atmospheric turbulence" shall be called the "tracking system".

Figure 1:
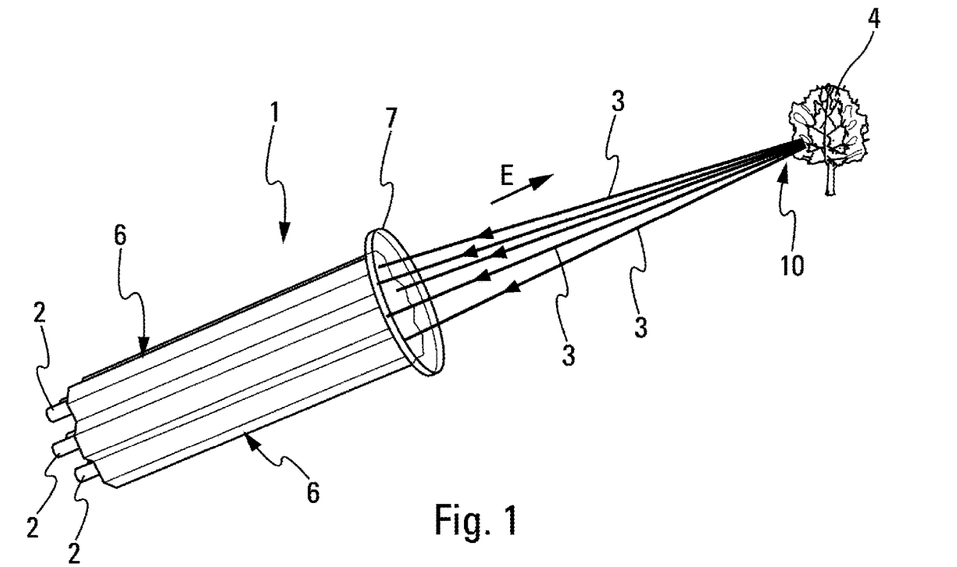
FIG. 1 shows a general perspective view of the tracking system.
Figure 3:
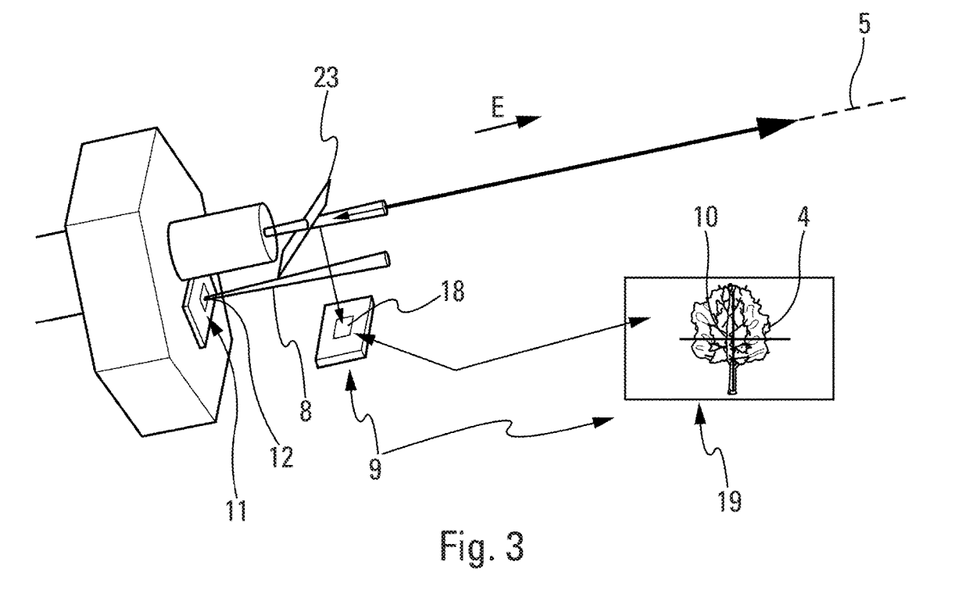
FIG. 3 shows a portion of the tracking system according to a first embodiment.

The target 4 can be a moving target or an immobile target. For example, the target can be a fighter aircraft or a building. In FIGS. 1 and 3, the target 4 corresponds to a tree.

Figure 2:
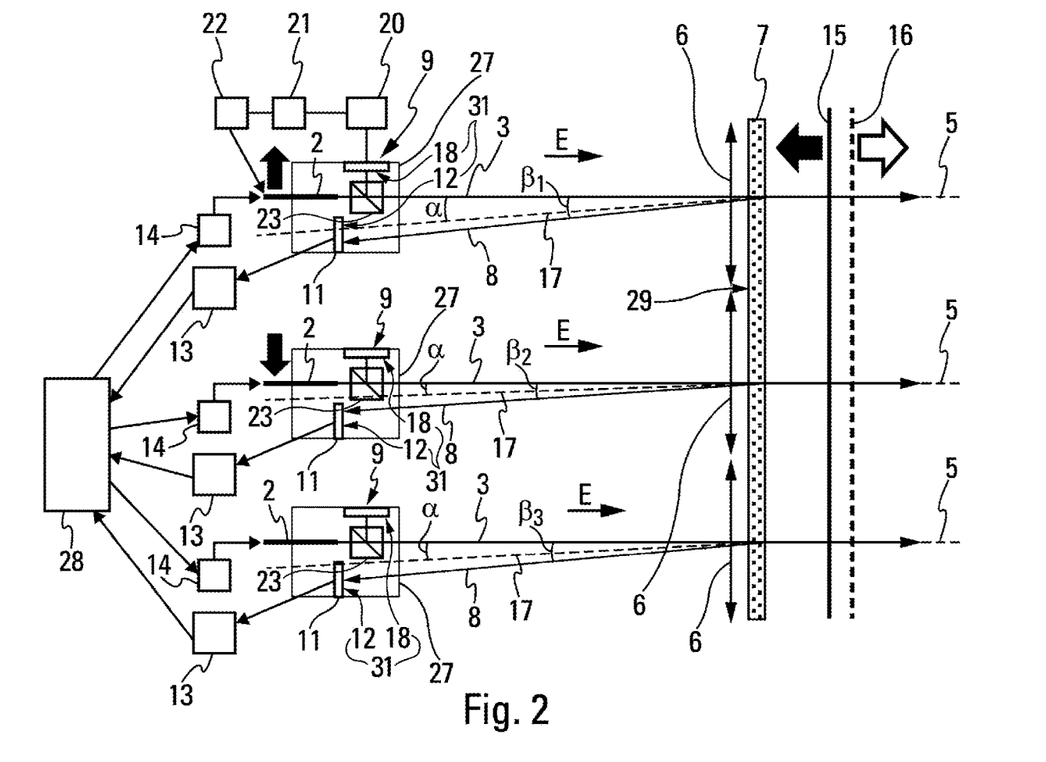
FIG. 2 shows a schematic cross-section of the tracking system.

As shown in FIGS. 1 and 2, tracking system 1 comprises at least two light sources 2, preferably, a plurality of light sources 2. For example, several tens of light sources 2. The light sources 2 are each configured to emit a light beam 3 to the target 4 along the direction of an axis of propagation 5 in an emission direction shown by the arrow referenced as E.

In a non-limiting manner, each of the light sources 2 can be a laser, or an emitter of a directional light or an end of an optical fibre that transmits the light of a laser or a directional light.

The tracking system 1 further comprises at least two collimators 6. Each of the collimators 6 is respectively associated with one of the light sources 2. Each of the collimators 6 is configured to collimate the light beam 3 of the associated light source 2.

Preferably, each of the light sources 2 is arranged in the focal plane of the collimator 6 with which it is associated.

Advantageously, each of the collimators 6 comprises at least one exit pupil and has an optical axis 17. The optical axis 17 forms a non-zero angle α with the axis of propagation 5 such that the axis of propagation 5 intersects the optical axis 17 on the exit pupil of each of the collimators 6.

In a non-limiting manner, the angle α between the axis of propagation 5 and the optical axis 17 has a value greater than 0° and less than or equal to 5°. Preferably, the angle α is between 2° and 3°.

The tracking system 1 also comprises a reference device 7 arranged downstream of all the collimators 6 in the emission direction E. The reference device 7 comprises a reflecting plane 29 configured to reflect a portion 8 of the light beam 3 exiting from all the collimators 6. The reflecting surface 29 of the reference device 7 is used as a common reference for all of the collimators 6.

According to an embodiment, the reflecting plane 29 comprises a plane plate comprising at least one separating surface capable of separating each of the light beams 3 exiting from each of the collimators 6 into two portions. The separating surface(s) is/are capable of reflecting a portion 8 of the light beam 3 of each of the collimators 6 and to transmit the remainder of the light beam 3.

In a non-limiting manner, the separating surface(s) has/have transmission rates of the light beam 3 of between 99% and 99.9%.

The tracking system 1 further comprises at least two targeting modules 9. Each of the targeting modules 9 is associated respectively and integrally with one of the light sources 2. Each of the targeting modules 9 is configured to lead the light beam 3 from the light source 2 to reach a predetermined zone 10 of the target 4.

The tracking system 1 also comprises at least two detection modules 11. Each of the detection modules 11 is associated respectively and integrally with one of the light sources 2. Each of the detection modules 11 comprises a detection surface 12 configured to receive the portion 8 of the light beam 3 reflected by the reflecting plane 29 of the reference device 7. The portion of the beam 8 reflected by the reflecting plane 29 is received and detected on the detection surface 12 at a current position.

The expression "associated integrally with one of the light sources" for the targeting modules 9 and the detection modules 11 means that these modules 9 and 11 are moved by following the same movement as the respective light source 2 thereof. For example, for each of the light sources 2, the light source 2, the associated targeting module 9 and the associated detection module 11 are fixed on one same support to form a unitary optoelectronic set 27. The light source 2 is then configured to be moved by the movement of the support on which are fixed the associated targeting module 9 and the associated detection module 11. The associated targeting module 9 and the associated detection module 11 then follow the same movement as the light source 2.

The respective distance between the light source 2 and the detection surface 12 of the associated detection module 11 is stable over time regardless of the environmental conditions. Preferably, this need is ensured thanks to a small distance between the light source 2 and the detection surface 12 of each of the detection modules 11. Typically, this distance is around a few millimetres. In a non-limiting manner, this distance is between 3 mm and 10 mm.

According to an embodiment, in order to have a distance value that is reliable and constant, the detection surface 12 of each of the detection modules 11 can be directly integrated into the glass of the casing of a laser through which the laser beam exits.

The tracking system 1 also comprises at least two modules for determining an angle of deviation 13 as an absolute value. Each of the modules for determining an angle of deviation 13 is respectively associated with one of the light sources 2. Each of the modules for determining deviation 13 is configured to determine respectively an angle of deviation $\beta_1$, $\beta_2$, $\beta_3$ from a spatial shift on the detection surface 12 between a reference position on the detection surface 12 and the current position. The angle of deviation $\beta_1$, $\beta_2$, $\beta_3$ is determined respectively by each of the detection modules 11 after each of the targeting modules 9 has led each of the light beams 3 to reach the predetermined zone 10 of the target 4.

The angle of deviation $\beta_1$, $\beta_2$, $\beta_3$ corresponds to an angle between the portion of the beam 8 reflected by the reflecting plane 29 of the reference device 7 and the axis of propagation 5.

The tracking system 1 also comprises a module for determining phase deviation 28, configured to determine phase deviations from angles of deviation $\beta_1$, $\beta_2$, $\beta_3$ determined by the at least two modules for determining an angle of deviation 13. Thus, each of the modules for determining an angle of deviation 13 sends to the module of determining phase deviation 28 a signal that represents the angle of deviation that it has determined.

For this, the module for determining phase deviation 28 is configured to determine a wave front reconstituted from angles of deviation $\beta_1$, $\beta_2$, $\beta_3$. The phase deviations are determined by the module for determining phase deviation 28 by comparing the reconstituted wave front with a plane wave front which is parallel to the reflecting plane 29 of the reference device 7. The comparison consists of determining the distance between the reconstituted wave front and the front of the plane wave front in line with each collimator 6. Thus, all of the modules for determining 13 make it possible for the module for determining phase deviation 28 to reconstitute a wave front 15 formed by the light beams 3.

The aim of the tracking system 1 is therefore to ensure that, on the one hand, the wave fronts 15 coming from the target 4 that carry the information on the atmospheric turbulence (or distortions) and, on the other hand, the wave fronts 16 exiting from the collimators 6 which reproduce the atmospheric turbulence are always the same wave fronts. In other words, the tracking system 1 makes it possible for the wave front 16 exiting from the collimators 6 to always be controlled on the wave front 15 coming from the target 4.

The tracking system 1 thus uses the principle of the Shack-Hartmann wave front analyser, wherein the shift between a reference position of a light beam and a current position of the light beam is representative of the phase deviation between a reference phase corresponding to the phase of a light beam arriving at the reference position and a current phase corresponding to the phase of a light beam arriving at the current position.

At least two adjustment modules 14 form part of the tracking system 1. Each of the adjustment modules 14 is respectively associated with one of the light sources 2. Each of the adjustment modules 14 is configured to adjust each one of the light sources 2 in order to compensate the atmospheric turbulence according to the phase deviations determined by the module for determining phase deviation 28. Thus, the module for determining phase deviation 28 sends to each one of the adjustment modules 14 a signal representative of a phase deviation such that each of the adjustment modules 14 adjusts the phase of the light sources 2. Each of the adjustment modules 14 thus calculates a movement to be carried out by the associated light source 2 thereof according to the representative signal of the phase deviation that it received from the module of determining phase deviation 28. The expression "compensate the atmospheric turbulence" means that the effects of the atmospheric turbulence are cancelled during the propagation of the light beam(s).

In FIG. 2, the wave front 15 shows the wave front of which the shape is determined by the module for determining phase deviation from angles of variation $\beta_1$, $\beta_2$, $\beta_3$. The wave front 16 (also shown in FIG. 2) shows the wave front after adjustment of the light sources 2.

According to a first configuration (FIG. 2), each of the targeting modules 9 comprises:
  a detection surface 18 configured to receive an image 19 that represents the target 4,
  a unit for locating 20 configured to locate on the image 19 of the target 4 received by the detection surface 18 a position of the predetermined zone 10 to be reached on the target 4 by the light beam 3 and a current position of the zone reached by the light beam 3,
  a unit for calculating 21 configured to calculate a movement to be carried out between the current position of the zone reached by the light beam 3 and the position of the predetermined zone 10 to be reached on the target 4, and
  a movement unit 22 configured to move the light source 2 such that the current position of the zone reached by the light beam 3 is superposed with the position of the predetermined zone 10 to be reached, from the movement to be carried out calculated by the unit for calculating 21.

For the sake of clarity, FIG. 2 shows the units 20, 21 and 22 for only one targeting module 9. It is, however, understood that each of the targeting modules 9 comprises these units 20, 21 and 22.

According to a first alternative of the first embodiment, tracking system 1 further comprises a plate 23 arranged in the axis of propagation 5. The plate 23 has a surface configured to receive the light beam 3 from the light source 2 and to receive the image 19 that represents the target 4. Said tracking system 1 is capable of transmitting the light beam 3 from the light source 2 and to reflect, towards the detection surface 18, the image 19 that represents the target 4.

According to a second alternative of the first embodiment, the plate 23 has a surface that is capable of reflecting the light beam 3 from the light source 2 and to transmit, towards the detection surface 18, the image 19 that represents the target.

According to a second embodiment (FIG. 4), the tracking system 1 further comprises a targeting laser device 24, configured to emit a targeting laser beam 25 on the predetermined zone 10 to be reached on the target 4. The targeting laser beam 25 can be emitted from a laser source arranged on the ground or aboard an aircraft.

Figure 4:
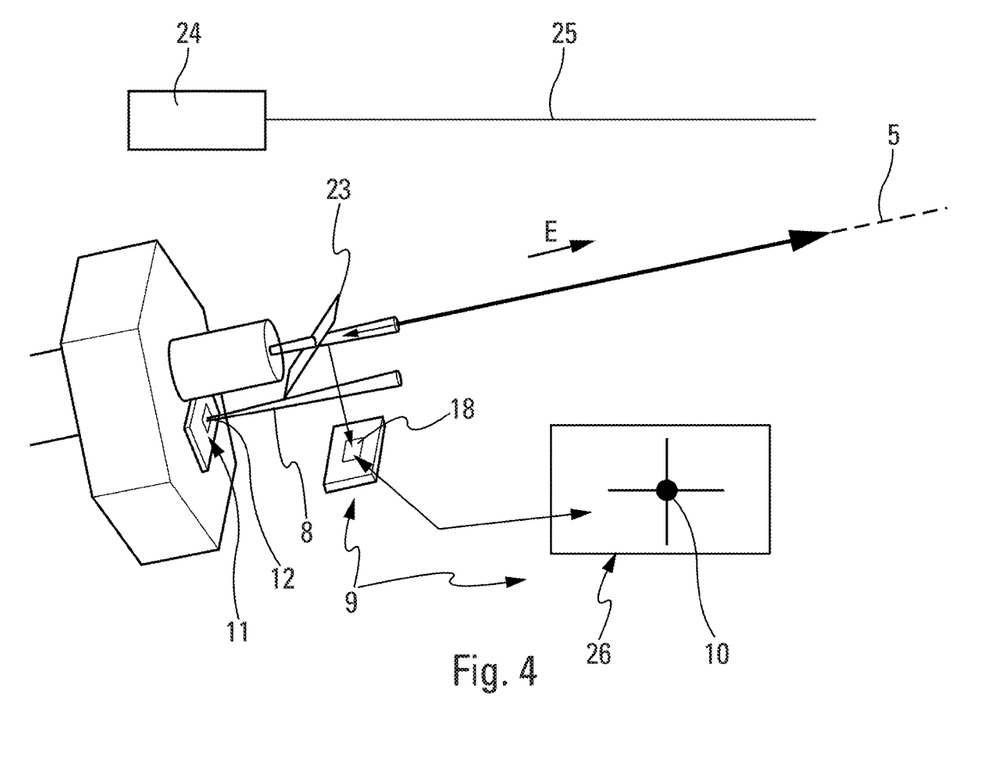
FIG. 4 shows the same portion of the tracking system according to a second embodiment.

In this second embodiment, each of the targeting modules 9 comprises:
- a detection surface 18 configured to receive an image 26 that represents a position of the targeting laser beam 25 on the target 4 and a position of the light beam 3 on the target 4,
- a unit for locating 20 configured to locate on the image 26 received by the detection surface 18 the position of the targeting laser beam on the target 4 and the current position of the light beam 3 on the target 4,
- a unit for calculating 21 configured to calculate a movement to be carried out between the current position of the light beam 3 on the target 4 and the position of the targeting laser beam 25 on the target 4, and
- a movement unit 22 configured to move the light source 2 such that the current position of the light beam 3 on the target 4 is superposed with the position of the targeting laser beam 25 on the target 4, from the movement to be carried out calculated by the unit for calculating 21.

According to a first alternative of the second embodiment, the tracking system 1 further comprises a plate 23 arranged in the axis of propagation 5. The plate 23 having a surface configured to receive the light beam 3 from the light source 2 and to receive the image 26 that represents the position of the targeting laser beam 25 on the target 4 and the position of the light beam 3 on the target 4. Said tracking system 1 is capable of transmitting the light beam 3 from the light source 2 and to reflect, towards the detection surface 18, the image 26 that represents the position of the targeting laser beam 25 on the target 4 and the position of the light beam 3 on the target 4.

According to a second alternative of the second embodiment, the surface is capable of reflecting the light beam 3 from the light source 2 and to transmit, towards the detection surface 18, the image 26 that represents the position of the targeting laser beam 25 on the target 4 and the position of the light beam 3 on the target 4.

The detection surface 12 and the detection surface 18 can correspond to array surfaces. For example, these array surfaces 12 and 18 include a CCD sensor or CMOS array that collectively form a processing module 31. The processing module 31 is capable of retrieving the signals generated and sent by the CCD sensor or CMOS to generate a signal that represents the positions described above.

According to one embodiment, the array surfaces comprise a bundle of optical fibres capable of transmitting the images 19, 26 and the positions to an array sensor. One end of each optical fibre forms part of the array surface. A processing module 31 is configured to retrieve the signals generated and sent by the array sensor. The processing module 31 can then send signals that represent positions. This embodiment makes it possible to overcome, for example, electromagnetic disturbances induced by the electrical wiring that the array sensor could be subjected to.

According to a configuration, the positions correspond to coordinates determined with respect to a virtual marking defined in the detection surfaces 12, 18. For example, the origin of the marking is at the centre of the detection surface 12, 18.

A pixel of the CCD or of the CMOS can correspond to a coordinate unit.

For the first embodiment (FIG. 3) and for the second embodiment (FIG. 4), in the same manner as that of the detection surface 12, the respective distance between the light source 2 and the detection surface 18 of the associated targeting module 9 is stable over time regardless of the environmental conditions. Preferably, this need is ensured thanks to a small distance between the light source 2 and the detection surface 18 of each of the targeting modules 9. Typically, this distance is around a few millimetres. In a non-limiting manner, this distance is between 3 mm and 10 mm.

Figure 5:
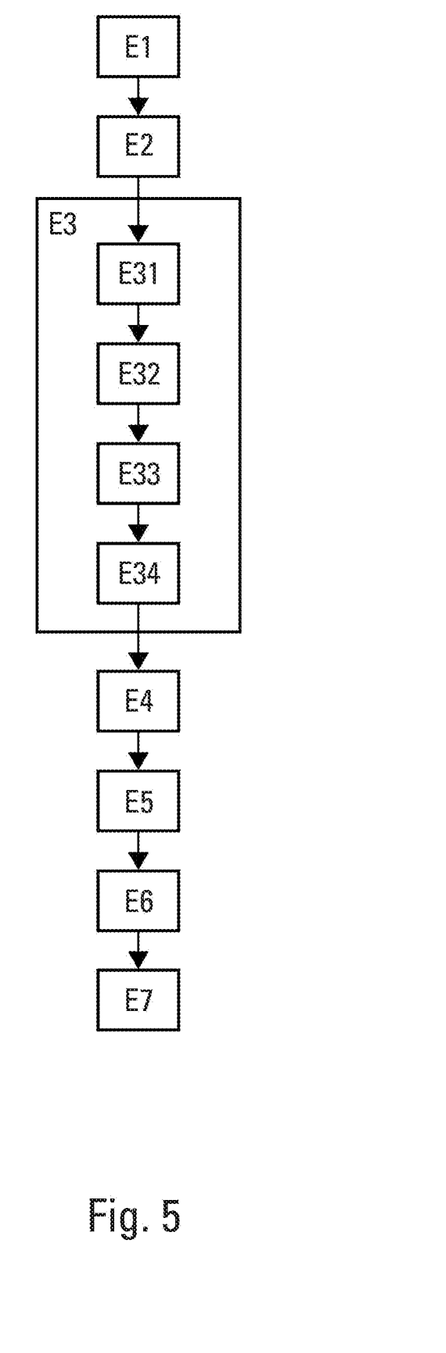
FIG. 5 schematically shows the steps of the method of using the tracking system according to the first embodiment.
Figure 6:
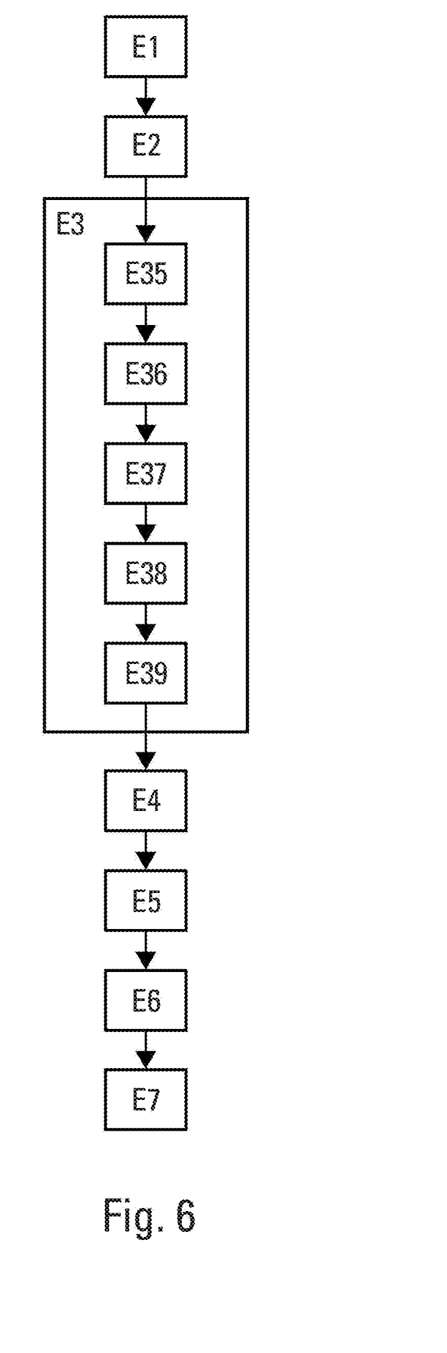
FIG. 6 schematically shows the steps of the method of using the tracking system according to the second embodiment.

The disclosure also relates to a method for using the tracking system 1 (FIGS. 5 and 6).

The method of use comprises the following steps, repeated cyclically:
- a step E1 of emitting, implemented by each of the light sources 2, comprising emitting a light beam 3 to the target 4 along the axis of propagation 5 in the emission direction E;
- a step E2 of collimating light sources 2, implemented by each of the collimators 6, comprising collimating each of the light beams 3 emitted by each of the light sources 2;
- a step E3 of targeting, implemented by each of the targeting modules 9, comprising leading the light beam 3 from the light source 2 to reach the predetermined zone 10 of the target 4;
- a step E4 of detecting, implemented by each of the detection modules 11, comprising receiving and detecting on the first detection surface 12 the portion of the beam 8 reflected by the reflecting plane 29 of the reference device 7 at a current position;
- a step E5 of determining angle of deviation, implemented by each of the modules for determining an angle of deviation 13, comprising determining an angle of deviation $\beta_1$, $\beta_2$, $\beta_3$ from a spatial shift on the first detection surface 12 between a reference position on the first detection surface 12 and the current position, the angle of deviation $\beta_1$, $\beta_2$, $\beta_3$ being determined after each of the targeting modules 9 has led each of the light beams 3 to reach the predetermined zone 10 of the target 4, the angle of deviation $\beta_1$, $\beta_2$, $\beta_3$ corresponding to an angle between the portion of the beam 8 reflected by the reflecting plane 29 of the reference device 7 and the axis of propagation 5;
- a step E6 of determining phase deviation, implemented by the module for determining phase deviation 28, comprising determining phase deviations from angles of deviation $\beta_1$, $\beta_2$, $\beta_3$ determined in the step E5 of determining angle of deviation; and
- a step E7 of adjusting, implemented by each of the adjustment modules 14, comprising adjusting each of the light sources 2 to compensate for atmospheric turbulence according to the phase deviations determined in the step E6 of determining phase deviation 28.

For this, the step E6 of determining phase deviation comprises the determining of the wave front reconstituted from angles of deviation $\beta_1$, $\beta_2$, $\beta_3$. The phase deviations being determined in the step E6 of determining phase deviation by comparing the reconstituted wave front with the plane wave front parallel to the reflecting plane 29 of the reference device 7.

According to the first embodiment (FIG. 5), the step E3 of targeting comprises the following sub-steps:
- a sub-step E31 of receiving, implemented by the detection surface 18, comprising receiving the image 19 that represents the target 4 on the detection surface 18;
- a sub-step E32 of locating, implemented by the unit for locating 20, comprising locating on the image 19 of the target 4 received by the detection surface 18 the position of the predetermined zone 10 to be reached on the target 4 by the light beam 3 and the current position of the zone reached by the light beam 3;
- a sub-step E33 of calculating, implemented by the unit for calculating 21, comprising calculating the movement to be carried out between the current position of the zone reached by the light beam 3 and the position of the predetermined zone 10 to be reached on the target 4; and
- a sub-step E34 of moving, implemented by the movement unit 22, comprising moving the light source 2 such that the current position of the zone reached by the light beam 3 is superposed with the position of the predetermined zone 10 to be reached, from the movement to be carried out calculated by the unit for calculating 21.

According to the second embodiment (FIG. 6), the step E3 of targeting comprises the following sub-steps:
- a sub-step E35 of emitting, implemented by the targeting laser device 24, comprising emitting the targeting laser beam 25 on the predetermined zone 10 to be reached on the target 4;
- a sub-step E36 of receiving, implemented by the detection surface 18, comprising receiving the image 26 that represents the position of the targeting laser beam 25 on the target 4 and the position of the light beam 3 on the target 4;
- a sub-step E37 of locating, implemented by the unit for locating 20, comprising locating on the image 26 received by the detection surface 18 the position of the targeting laser beam 25 on the target 4 and the current position of the light beam 3 on the target 4;
- a sub-step E38 of calculating, implemented by the unit for calculating 21, comprising calculating the movement to be carried out between the current position of the light beam 3 on the target 4 and the position of the targeting laser beam 25 on the target 4; and
- a sub-step E39 of movement, implemented by the movement unit 22, comprising moving the light source 2 such that the current position of the light beam 3 on the target 4 is superposed with the position of the targeting laser beam 25 on the target 4, from the movement to be carried out calculated by the unit for calculating 21.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for tracking a target and for compensating for atmospheric turbulence, comprising:
    - at least two light sources each configured to emit a light beam to the target along an axis of propagation in an emission direction;
    - at least two collimators, with each of the collimators being respectively associated with one of the light sources, with each of the collimators being configured to collimate the light beam of the associated light source;
    - a reference device arranged downstream of all the collimators in the emission direction, the reference device comprising a reflecting plane configured to reflect a portion of the light beam exiting from all the collimators;
    - at least two targeting modules, with each of the targeting modules being associated respectively and integrally with one of the light sources, with each of the targeting modules being configured to lead the light beam from the light source to reach a predetermined zone of the target;
    - at least two detection modules, with each of the detection modules being associated respectively and integrally with one of the light sources, with each of the detection modules comprising a first detection surface configured to receive the portion of the beam reflected by the reflecting plane of the reference device, the portion of the beam reflected by the reflecting plane of the reference device being received and detected on the first detection surface at a current position;
    - at least two first modules for determining an angle of deviation, configured to respectively determine an angle of deviation from a spatial shift on the first detection surface between a reference position on the first detection surface and the current position, the angle of deviation being determined after each of the targeting modules has led each of the light beams to reach the predetermined zone of the target, with the angle of deviation corresponding to an angle between the portion of the beam reflected by the reflecting plane of the reference device and the axis of propagation;
    - a second module for determining phase deviation, configured to determine phase deviations from angles of deviation determined by the at least two first modules for determining an angle of deviation, with the second module for determining phase deviation being configured to determine a wave front reconstituted from angles of deviation, the phase deviations being determined by the second module for determining phase deviation by comparing the reconstituted wave front with a plane wave front which is parallel to the reflecting plane of the reference device; and
    - at least two adjustment modules, configured to adjust each of the light sources in order to compensate for the atmospheric turbulence according to the phase deviations determined by the second module for determining phase deviation.

2. The system according to claim 1, wherein each of the collimators comprises at least one exit pupil, with each of the collimators having an optical axis, with the optical axis forming a non-zero angle with the axis of propagation such that the axis of propagation intersects the optical axis on the exit pupil of each of the collimators.

3. The system according to claim 2, wherein the non-zero angle has a value greater than 0° and less than or equal to 5°.

4. The system according to claim 1, wherein each of the targeting modules comprises:
- a second detection surface configured to receive an image that represents the target;
- a first unit for locating configured to locate on the image of the target received by the second detection surface a position of the predetermined zone to be reached on the target by the light beam and a current position of the zone reached by the light beam;
- a second unit for calculating configured to calculate a movement to be carried out between the current position of the zone reached by the light beam and the position of the predetermined zone to be reached on the target; and
- a movement unit configured to move the light source such that the current position of the zone reached by the light beam is superposed with the position of the predetermined zone to be reached, from the movement to be carried out calculated by the unit for calculating.

5. The system according to claim 4, further comprising a plate arranged in the axis of propagation, with the plate having a surface configured to receive the light beam from the light source and to receive the image that represents the target,
and wherein the surface is capable of transmitting the light beam from the light source and to reflect towards the second detection surface the image that represents the target.

6. The system according to claim 4, further comprising a plate arranged in the axis of propagation, with the plate having a surface configured to receive the light beam from the light source and to receive the image that represents the target,
and wherein the surface is capable of reflecting the light beam from the light source and to transmit towards the second detection surface the image that represents the target.

7. The system according to any claim 1, further comprising a targeting laser device, configured to emit a targeting laser beam on the predetermined zone to be reached on the target, and wherein each of the targeting modules comprises:
- a second detection surface configured to receive an image that represents a position of the targeting laser beam on the target and a position of the light beam on the target;
- a first unit for locating configured to locate on the image received by the second detection surface the position of the targeting laser beam on the target and the current position of the light beam on the target;
- a second unit for calculating configured to calculate a movement to be carried out between the current position of the light beam on the target and the position of the targeting laser beam on the target; and
- a movement unit configured to move the light source such that the current position of the light beam on the target is superposed with the position of the targeting laser beam on the target, from the movement to be carried out calculated by the unit for calculating.

8. The system according to claim 7, further comprising a plate arranged in the axis of propagation, with the plate having a surface configured to receive the light beam from the light source and to receive the image that represents the position of the targeting laser beam on the target and the position of the light beam on the target,
and wherein the surface is capable of transmitting the light beam from the light source and to reflect towards the second detection surface the image that represents the position of the targeting laser beam on the target and the position of the light beam on the target.

9. The system according to claim 7, further comprising a plate arranged in the axis of propagation, with the plate having a surface configured to receive the light beam from the light source and to receive the image that represents the position of the targeting laser beam on the target and the position of the light beam on the target,
and wherein the surface is capable of reflecting the light beam from the light source and to transmit towards the second detection surface the image that represents the position of the targeting laser beam on the target and the position of the light beam on the target.

10. A method for using the system for tracking a target and for compensating for atmospheric turbulence according to claim 1, the method comprising the following steps, repeated cyclically:
- a step (E1) of emitting, implemented by each of the light sources, comprising emitting a light beam to the target along an axis of propagation in an emission direction;
- a step (E2) of collimating light beams, implemented by each of the collimators, comprising collimating each of the light beams emitted by each of the light sources;
- a step (E3) of targeting, implemented by each of the targeting modules, comprising leading the light beam from the light source to reach a predetermined zone of the target;
- a step (E4) of detecting, implemented by each of the detection modules, comprising receiving and detecting on the first detection surface the portion of the beam reflected by the reflecting plane of the reference device at a current position;
- a step (E5) of determining an angle of deviation, implemented by each of the first modules for determining an angle of deviation, comprising determining an angle of deviation from a spatial shift on the first detection surface between a reference position on the first detection surface and the current position, the angle of deviation being determined after each of the targeting modules has led each of the light beams to reach the predetermined zone of the target, the angle of deviation corresponding to an angle between the portion of the beam reflected by the reflecting plane of the reference device and the axis of propagation;
- a step (E6) of determining phase deviation, implemented by the second module for determining phase deviation, comprising determining phase deviations from angles of deviation determined in the step (E5) of determining angle of deviation, the step (E6) of determining phase deviation comprising the determining of a wave front reconstituted from angles of deviation, with the phase deviations being determined in the step (E6) of determining phase deviation by comparing the reconstituted wave front with a plane wave front which is parallel to the reflecting plane of the reference device; and
- a step (E7) of adjusting, implemented by each of the adjustment modules, comprising adjusting each of the light sources to compensate for atmospheric turbulence according to the phase deviations determined in the step of determining phase deviation.

11. The method according to claim 10, wherein the step (E3) of targeting comprises the following sub-steps:
- a sub-step (E31) of receiving, implemented by a second detection surface, comprising receiving an image that represents the target on the second detection surface;
- a sub-step (E32) of locating, implemented by a first unit for locating, comprising locating on the image of the target received by the second detection surface a position of the predetermined zone to be reached on the target by the light beam and a current position of the zone reached by the light beam;

a sub-step (E33) of calculating, implemented by a second unit for calculating, comprising calculating a movement to be carried out between the current position of the zone reached by the light beam and the position of the predetermined zone to be reached on the target; and a sub-step (E34) of moving, implemented by a movement unit, comprising moving the light source such that the current position of the zone reached by the light beam is superposed with the position of the predetermined zone to be reached, from the movement to be carried out calculated by the unit for calculating.

12. The method according to claim 10, wherein the step of targeting (E3) comprises the following sub-steps:

a sub-step (E35) of emitting, implemented by a targeting laser device, comprising emitting a targeting laser beam on the predetermined zone to be reached on the target;

a sub-step (E36) of receiving, implemented by a second detection surface, comprising receiving an image that represents a position of the targeting laser beam on the target and a position of the light beam on the target;

a sub-step (E37) of locating, implemented by a first unit for locating, comprising locating on the image received by the second detection surface the position of the targeting laser beam on the target and the current position of the light beam on the target;

a sub-step (E38) of calculating, implemented by a second unit for calculating, comprising calculating a movement to be carried out between the current position of the light beam on the target and the position of the targeting laser beam on the target; and a sub-step (E39) of moving, implemented by a movement unit, comprising moving the light source such that the current position of the light beam on the target is superposed with the position of the targeting laser beam on the target, from the movement to be carried out calculated by the unit for calculating.

\* \* \* \* \*